(12) United States Patent
Pacchione et al.

(10) Patent No.: US 9,358,642 B2
(45) Date of Patent: Jun. 7, 2016

(54) MOVABLE JOINING DEVICE FOR CONNECTING STRUCTURAL COMPONENTS OF AN AIRCRAFT

(71) Applicant: Airbus Operations GmbH, Hamburg (DE)

(72) Inventors: Marco Pacchione, Hamburg (DE); Matteo Pezzi, Russi (IT); Valentin Richter-Trummer, Ermesinde (PT)

(73) Assignee: Airbus Operations GmbH (DE)

( * ) Notice: Subject to any disclaimer, the term of this patent is extended or adjusted under 35 U.S.C. 154(b) by 4 days.

(21) Appl. No.: 13/645,541

(22) Filed: Oct. 5, 2012

(65) Prior Publication Data

US 2013/0334289 A1  Dec. 19, 2013

Related U.S. Application Data

(60) Provisional application No. 61/543,878, filed on Oct. 6, 2011.

(30) Foreign Application Priority Data

Oct. 6, 2011  (DE) .......................... 10 2011 114 924

(51) Int. Cl.
  *B23K 37/02* (2006.01)
  *B23K 20/12* (2006.01)
(52) U.S. Cl.
  CPC ........... *B23K 37/0217* (2013.01); *B23K 20/122* (2013.01); *B23K 37/0211* (2013.01)
(58) Field of Classification Search
  USPC ............................................... 228/2.1, 112.1
  See application file for complete search history.

(56) References Cited

U.S. PATENT DOCUMENTS

| | | | |
|---|---|---|---|
| 2,398,355 A * | 4/1946 | Bristol | .......................... 226/187 |
| 2,472,317 A | 6/1949 | Sorensen et al. | |
| 3,201,561 A * | 8/1965 | Damon | .................... 219/124.31 |
| 3,229,883 A | 1/1966 | Yost | |
| 5,070,792 A | 12/1991 | Harris | |
| 5,499,451 A | 3/1996 | Krivda et al. | |
| 6,708,865 B2 * | 3/2004 | Yoshinaga | ................. 228/112.1 |
| 6,843,328 B2 | 1/2005 | Boyl-Davis et al. | |
| 6,854,632 B1 | 2/2005 | Larsson | |

(Continued)

FOREIGN PATENT DOCUMENTS

| | | |
|---|---|---|
| DE | 1527383 A1 | 2/1972 |
| DE | 19834702 A1 | 2/2000 |

(Continued)

OTHER PUBLICATIONS

U.S. Appl. No. 13/633,965, filed Oct. 3, 2012.

(Continued)

*Primary Examiner* — Devang R Patel
(74) *Attorney, Agent, or Firm* — Lerner, David, Littenberg, Krumholz & Mentlik, LLP

(57) ABSTRACT

A movable joining device for connecting structural components of an aircraft, with joining means moveably arranged on a guiding device situated on the outside of the structural components so as to fixedly connect joining edges of the structural components positioned adjacent to each other, wherein the joining means includes a welding unit that can move on the rail-like guiding device, and is equipped with a special so-called bobbin tool as a tool for friction stir welding.

7 Claims, 1 Drawing Sheet

(56) References Cited

U.S. PATENT DOCUMENTS

| | | | |
|---|---|---|---|
| 7,448,528 | B2 | 11/2008 | Forrest et al. |
| 7,748,592 | B2 * | 7/2010 | Koga et al. .................. 228/2.1 |
| 7,896,216 | B2 * | 3/2011 | Fujimoto et al. ............. 228/2.1 |
| 2003/0047858 | A1 | 3/2003 | Tsuchiya et al. |
| 2003/0209586 | A1 | 11/2003 | Thompson |
| 2008/0029578 | A1 | 2/2008 | Steel et al. |
| 2010/0213244 | A1 | 8/2010 | Miryekta et al. |

FOREIGN PATENT DOCUMENTS

| | | | |
|---|---|---|---|
| DE | 69712078 | T2 | 12/2002 |
| DE | 102007044974 | A1 | 4/2009 |
| EP | 1354661 | A2 | 10/2003 |
| EP | 1736271 | A1 | 12/2006 |
| EP | 1826559 | A1 * | 8/2007 |
| EP | 2140965 | A1 | 1/2010 |
| JP | 2007054851 | A | 3/2007 |
| JP | 2009061479 | A | 3/2009 |

OTHER PUBLICATIONS

Parker et al., "Portable Friction Stir Welding Technology for Aluminum Fabrication", NSRP meeting, Aug. 17-18, 2010.

Talia et al., "Constructing a Prototype Man-Portable Friction Stir Welding System", NSRP SP-7 Meeting, Aug. 17, 2010.

European Search Report for Application No. 12186586.9 dated May 3, 2016.

* cited by examiner

MOVABLE JOINING DEVICE FOR CONNECTING STRUCTURAL COMPONENTS OF AN AIRCRAFT

CROSS-REFERENCE TO RELATED APPLICATIONS

The present application claims the benefit of the filing date of U.S. Provisional Patent Application No. 61/543,878 filed Oct. 6, 2011, the disclosure of which is hereby incorporated herein by reference.

AREA OF THE INVENTION

The invention relates to a movable joining device for connecting structural components of an aircraft, with joining means moveably arranged on a guiding device situated on the outside of the structural components, so as to fixedly connect joining edges of the structural components positioned adjacent to each other.

The area of application of the invention extends to aircraft construction. In order to assemble large-volume fuselages, for example of commercial aircraft, individual structural components, such as side parts, floor parts and ceiling parts, are connected via longitudinal welds to form a single fuselage section, and subsequently joined together to form the aircraft fuselage via transverse welds. Also conceivable aside from that is for individual fuselage sections resembling hollow cylinders to be configured as two pieces or one piece. Each structural component consists of a substructure comprised of longitudinally running stringers and bulkheads running transverse thereto, upon which is secured the outer skin of the aircraft, which most often consists of a light sheet metal. The individual structural parts are usually joined together by riveting.

BACKGROUND OF THE INVENTION

Known from U.S. Pat. No. 6,843,328 B2 is a movable joining device for joining structural components to be interconnected via riveting. The joining device consists of a rectangular frame structure, which can be secured with vacuum suction cups mounted on the bottom side to the structural components to be interconnected along the joining edges. This frame structure forms a guiding device for carrier cars that can be moved hereupon along the joining edges. Mounted onto the carrier car is a drilling unit, which can be moved to each riveting position along the joining edges via the guiding device.

This movable joining device from prior art is designed for connecting structural components with rivets, and must be shifted further by sections along the joining edges, so as to create a row of rivets along the entire length of the joining edges of the structural components.

Known from DE 198 34 702 A1 is a riveting device for manufacturing a hollow cylindrical fuselage section, which consists of an outer and an inner device part. The outer device part exhibits a riveting machine system, which is guided in an annular rail guide, and the inner device part exhibits a riveting robot situated on a support. The riveting robot is actuated by a control unit in order to concertedly position inner and outer device parts at the riveting site and concertedly control the operational sequence.

As a result, this two-part riveting device requires device constituents both inside the fuselage section and outside the fuselage section, which must be coordinated in terms of control technology.

BRIEF SUMMARY OF THE INVENTION

An aspect of the present invention provides a movable joining device for connecting large structural components of an aircraft, which can be used only on one side of the structural components to be interconnected, and makes it possible to reliably connect the joining edges of the structural components.

An aspect of the invention includes the technical instruction based upon which the joining means encompass a welding unit that can be moved on the rail-like guiding device, and is equipped with a special so-called bobbin tool as a tool for friction stir welding.

In friction stir welding, the frictional energy is generated via the wear-free rotation of the rotating tool. The rotating tool is pressed with a high force into the joining gap between the structural parts to be interconnected, and at least one tool shoulder comes to abut against the component surface. The friction between the at least one tool shoulder and joining edges of the structural components causes the material to under the shoulder to heat up to just under the melting point. This temperature rise leads to a drop in strength, as a result of which the material is plasticized, and the joining zones can be mixed. Initiating a feed motion along the joining edges prompts the rotating tool to continue moving while exerting a high contact force. The pressure gradient between the front and rear side of the tool caused by the feed motion and its rotational movement transport the plasticized material around the tool, which there mixes together and forms the welded seam. According to an embodiment of the invention, the joining means designed as such a welding unit are equipped with a bobbin tool known in the art as the tool for friction stir welding.

The bobbin tool has two opposing tool shoulders that simultaneously act on both work piece surfaces. This permits the exclusion of a counter bracket, which otherwise must be provided on the side of the work piece lying opposite the outer tool shoulder, i.e., the interior of the structural component in the application according to an aspect of the invention. Such a bobbin tool makes it possible to weld the structural components to be interconnected using a guiding device situated only on the outside or inside of the structural component. Within the framework of the invention, the bobbin tool is also understood to encompass other tools for friction stir welding that are equipped with two rotating or non-rotating tool shoulders. The bobbin tool is preferably secured to the welding head so that it can be shifted in the longitudinal direction, allowing it to be adjusted before and during the welding process.

In a preferred embodiment, the movable welding unit according to an embodiment of the invention encompasses a carrier car, which can be moved along the rail-like guiding device by way of an integrated drive motor, as well as a welding head for accommodating the bobbin tool for friction stir welding. The carrier car can here be biaxial in design, and in this regard travel on the guiding device, preferably on four wheels. A car hinge acting horizontally between the axes can here serve to balance out any uneven wheel pan given a rail-like guiding device. The carrier car can itself also be rigid or articulated in design. The car hinge of the rail-like guiding device causes the welding head to always remain aligned perpendicular to the work piece surface. Additional actuators can be used to introduce fine adjustments before or during the welding process.

According to an embodiment of the invention, the welding head preferably is resiliently secured to the carrier car in a vertical direction, so as to adjust the bobbin tool to the progression of the joining edges. This is because the structural components to be interconnected are usually curved, and the resultant tracking of the bobbin tool in a vertical direction makes it possible to realize a contour adjustment using simple technical means. In a vertical direction here signifies that the welding head can be moved at a right angle relative to the work piece surface. In addition, it is also conceivable to use a linear motor for adjusting the welding head to the curved progression of the structural components in a vertical direction. The linear motor can be a hydraulic unit or an electric linear motor, for example, which in terms of control engineering can be actuated using a corresponding sensor system that encompasses the surface contour. Similarly to the vertical shift described above, the welding head can also be horizontally shifted relative to the welding car, so as to adjust the bobbin tool to the progression of the joining edges.

In addition to being used in conjunction with a welding unit, the rail-like guiding device according to an embodiment of the invention can also be utilized for a separating unit. Such a separating unit can optionally be placed on the guiding device, and used to easily tailor the structural components to their final dimensions or clean them, so as to achieve a precise progression of the joining edges positioned adjacent to each other for the subsequent friction stir welding.

Furthermore, it is conceivable to use the rail-like guiding device while utilizing coating units to apply a surface coating after welding, polishing units to remove and/or polish welding marks or a sensor unit with an ultrasound head or the like to perform a final quality control on the fabricated welded seam.

The rail-like guiding device is preferably secured on the outside of the structural components in the area of the joining edges. Due to the good accessibility, such an external attachment of the guiding device facilitates a quick and simple assembly or disassembly of the movable joining device according to the invention.

The rail-like guiding device preferably consists of carrier profiles that are detachably secured along the two joining edges and each allocated thereto, and preferably designed as an L-profile. This yields a stable guidance of the carrier car.

To further improve the stable guidance of the carrier car, it is proposed that the floor of each carrier profile be provided with a guiding rail, which positively engages the carrier car for guiding and absorbing process-induced transverse forces along with longitudinal forces. The guiding rail can here be designed with a tooth system, so as to move the carrier car along the guide way by means of a gear drive.

In addition, it is also conceivable to move the carrier car along the rail-like guiding device on wheels, provided a non-slip drive is ensured.

BRIEF DESCRIPTION OF THE DRAWINGS

Additional aspects of the invention will be illustrated in greater detail below in conjunction with the description of a preferred exemplary embodiment of the invention based on the figures. Shown on.

DETAILED DESCRIPTION

Figure 1:
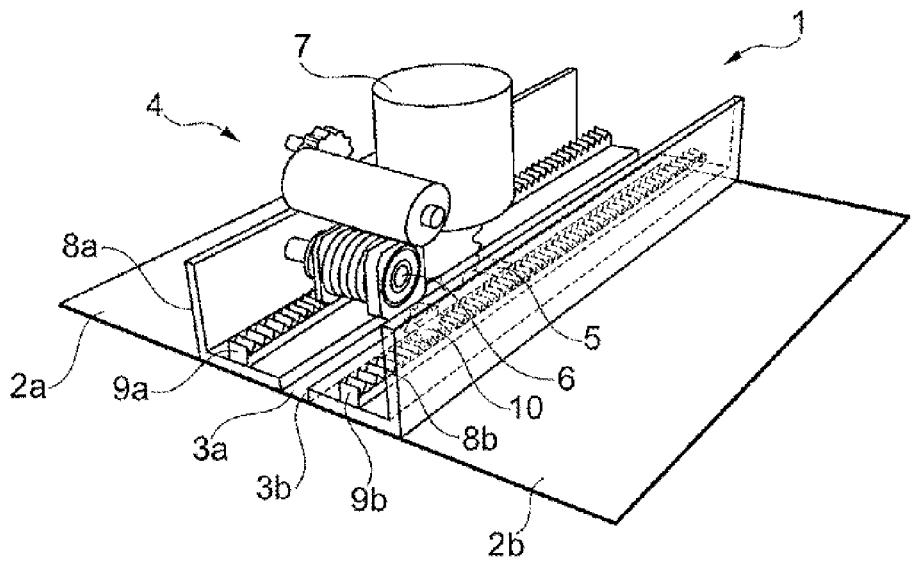
FIG. 1 is a perspective view of a movable joining device, which is detachably placed on two structural components to be interconnected in the area of corresponding joining edges.

According to FIG. 1, a guiding device 1 is arranged on the outside of the structural components 2a and 2b, only sections of which are depicted here. The guiding device 1 is situated on either side of joining edges 3a and 3b, which each are allocated to one of the structural components 2a or 2.

The rail-like guiding device 1 carries a welding unit 4 that can be moved hereupon along the joining edges 3a and 3b. The two structural components 2a and 2b are welded with each other along the joining edges 3a and 3b by means of the welding unit 4 using the friction stir welding method.

The movable welding unit 4 consists of a carrier car 5, which can be moved along the rail-like guiding device 1 by way of a drive motor 6. Furthermore, a welding head 7 is mounted on the carrier car 5 for implementing the friction stir welding method.

The guiding device 1 consists of carrier profiles 8a and 8b that are arranged along the two joining edges 3a and 3b, which here exhibit an L-shaped cross section. A respective guiding rail 9a or 9b is formed on the floor of the two carrier profiles 8a and 8b, and positively engages the carrier car 5. In this exemplary embodiment, the carrier car 5 is (exemplarily) provided with toothed wheels 10, so as to transfer the driving force generated by the drive motor 6 to the carrier profiles 9a and 9b designed as toothed racks.

Figure 2:
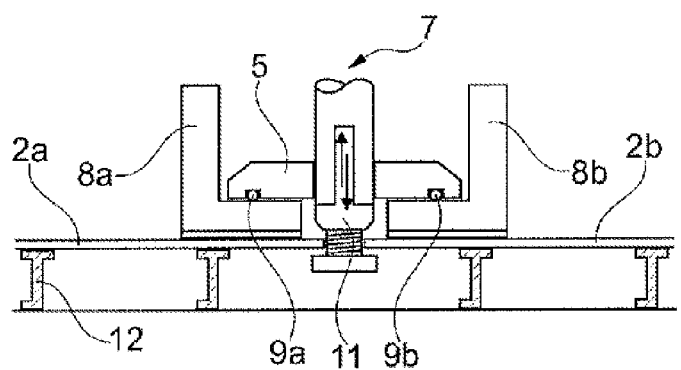
FIG. 2 is a schematic front view of the joining device according to FIG. 1.

According to FIG. 2, the guiding rails 9a and 9b on the two carrier profiles 8a and 8b are also provided so as to form a unit that is immovable in the transverse direction together with the carrier car 5, so that transverse forces stemming from the welding process can also be absorbed by the carrier car 5. This prevents the joining edges 3a and 3b from not shifting during the friction stir welding process. Only partially depicted here, the welding head 7 is equipped with a bobbin tool 11 as the tool for friction stir welding. The welding head 7 is secured to the carrier car 5 so that it can resiliently move in the vertical direction, in order to tailor the bobbin tool to the curved progression of the structural components 2a and 2b.

The two carrier profiles 8a and 8b of the rail-like guiding device 1 are secured to the outside of the structural components 2a and 2b by means of detachable fastening means. Several spaced apart stringers 12 run along the inside of the structural components 2a and 2b to reinforce the structural component 2a or 2b.

Figure 3:
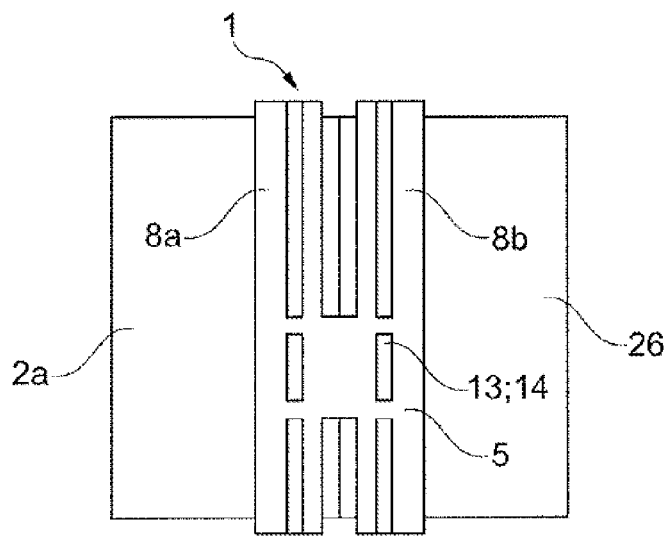
FIG. 3 is a schematic top view of the joining device according to FIG. 1.

According to FIG. 3, the rail-like guiding device can also be used for other structural units. For example, it is also possible to provide the carrier car 5 of the guiding device 1 with a separating unit 13. The separating unit 13 can be equipped with a cutting disk as the tool for cutting the joining edges 3a and 3b of the structural components 2a and 2b to their final dimensions prior to welding. In addition, it is also conceivable for the carrier car 5 to be equipped with a sensor unit 14 for performing a quality control on the separating or welding process. For example, the sensor unit 14 can in this way be designed as an ultrasound measuring device to check the quality of the welded seam.

In addition, let it be noted that "encompass" does not preclude any other elements or steps, and "an" or "a" do not rule out a plurality. Let it further be noted that the features or steps described with reference to one of the above exemplary embodiments can also be used in combination with other features or steps of other exemplary embodiments described above. References in the claims are not to be construed as a limitation.

REFERENCE LIST

1 Guiding device
2 Structural component
3 Joining edge
4 Welding unit

5 Carrier car
6 Drive motor
7 Welding head
8 Carrier profile
9 Guiding rail
10 Toothed wheel
11 Bobbin tool
12 Stringer
13 Separating unit
14 Sensor unit

The invention claimed is:

1. A movable joining device for connecting first and second structural components of an aircraft, the device comprising:
   a welding unit comprising a carrier car and moveably arranged on a rail-like guiding device situated on the outside of the first and second structural components, so as to fixedly connect, in a welding process, first and second joining edges of the first and second structural components positioned adjacent to each other, respectively,
   wherein the welding unit is configured to move on the rail-like guiding device, and comprises a bobbin tool for friction stir welding;
   wherein the rail-like guiding device consists of first and second carrier profiles situated along the first and second joining edges, respectively;
   wherein each of the first and second carrier profiles comprises a guiding rail configured to positively engage the carrier car for guiding and absorbing at least transverse process-induced forces, wherein each guiding rail comprises a toothed rack to move the carrier car along the guiding rail by toothed wheels provided on the carrier car; and
   wherein the carrier car comprises:
   a sensor for performing a quality control on at least one of a separating process and the welding process; and
   a separating unit having a cutting tool for cutting the first and second joining edges prior to the welding process.

2. The movable joining device of claim 1, wherein the movable welding unit comprises:
   the carrier car configured to be moved along the rail-like guiding device by an integrated drive motor, and
   a welding head for accommodating the bobbin tool for friction stir welding.

3. The movable joining device of claim 2, wherein the welding head is secured to the carrier car so that the welding head is configured to move in at least one of the vertical direction and horizontal direction, so as to adjust the bobbin tool to the progression of the joining edges.

4. The movable joining device of claim 1, wherein the carrier car is horizontally articulated between the axes, so as to create a uniform support on the three dimensionally progressing guiding device.

5. The movable joining device of claim 1, wherein the separating unit is configured to clean the structural components prior to welding.

6. The movable joining device of claim 1, wherein the rail-like guiding device is detachably secured to the outside of the structural components in the area of the joining edges.

7. The movable joining device of claim 1, wherein the at least first and second carrier profiles comprise a flat or L-shaped cross section.

* * * * *